United States Patent

[11] 3,596,326

[72] Inventors Rubert E. Annis, Jr.
Salem;
Robert A. Melloni, Peabody; Henry L.
Wright, Ipswich, all of, Mass.
[21] Appl. No. 799,281
[22] Filed Feb. 14, 1969
[45] Patented Aug. 3, 1971
[73] Assignee USM Corporation
Boston, Mass.

[54] INJECTION MACHINES
2 Claims, 3 Drawing Figs.

[52] U.S. Cl. .................................................... 18/30 SS
[51] Int. Cl. ...................................................... B29f 1/00
[50] Field of Search ........................................... 18/30 SRE,
30 SRM, 30 SRR

[56] References Cited
UNITED STATES PATENTS
3,427,639  2/1969  Strauss ........................ 18/30

3,509,601  5/1970  Johansson .................... 18/30

Primary Examiner—H. A. Kilby, Jr.
Attorneys—W. Bigelow Hall, Richard A. Wise and Scott R. Foster ABSTRACT: An injection machine including a frame, tie bars mounted on the frame, bracket means slidably mounted on the tie bars, a plasticator mounted on the bracket means, first motive means mounted on the frame for moving the plasticator into position for injecting into a mold assembly, second motive means supported by the bracket means for selectively moving a plasticator screw axially within the plasticator, and third motive means supported by the bracket means for moving the plasticator screw rotatively, drive gear means comprising a portion of the third motive means being so disposed and arranged as to be readily replaceable, and means for readily replacing the plasticator screw, whereby to provide a compact machine having all necessary motive means thereon and suitable for handling several materials under varying conditions.

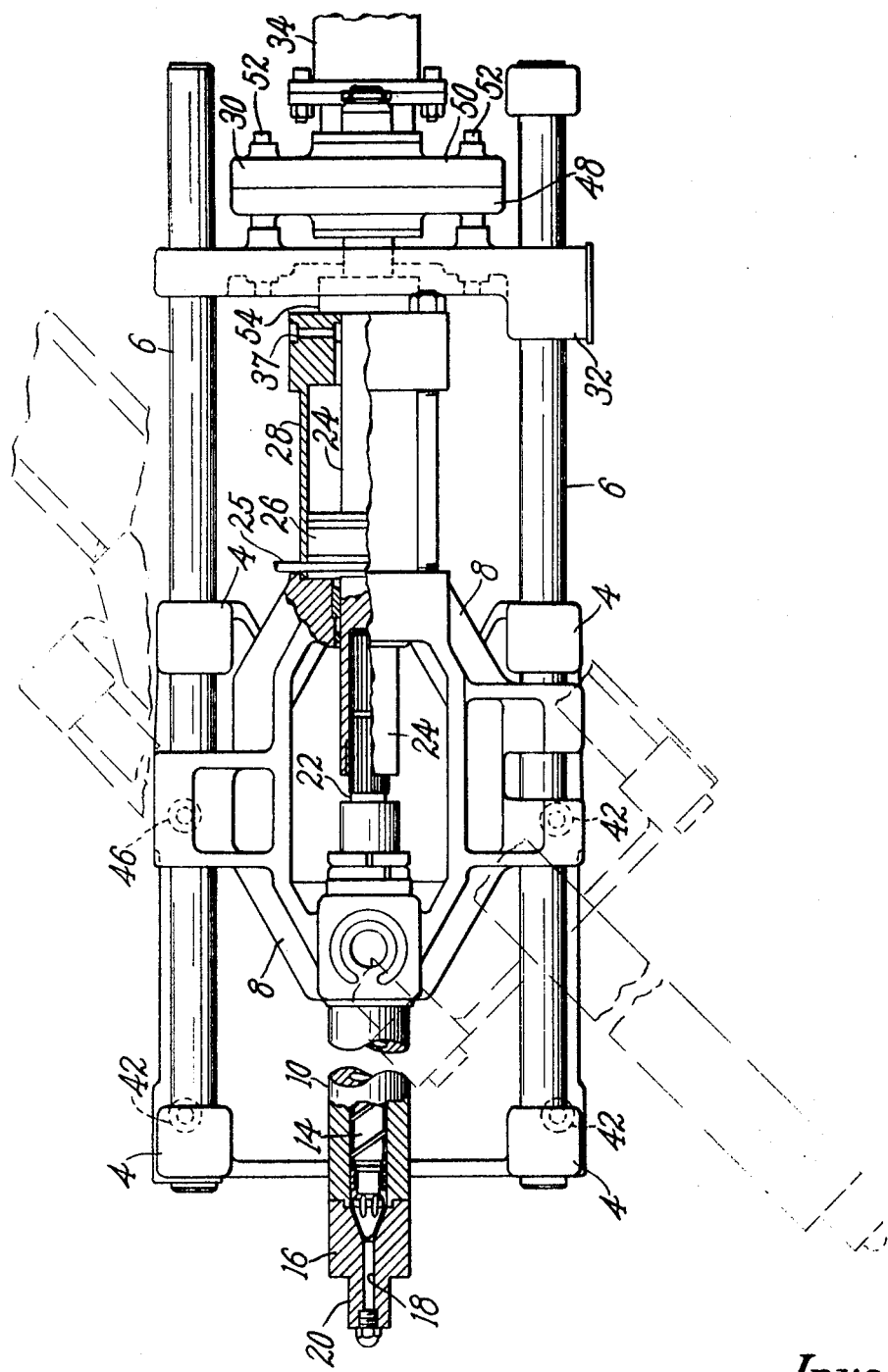

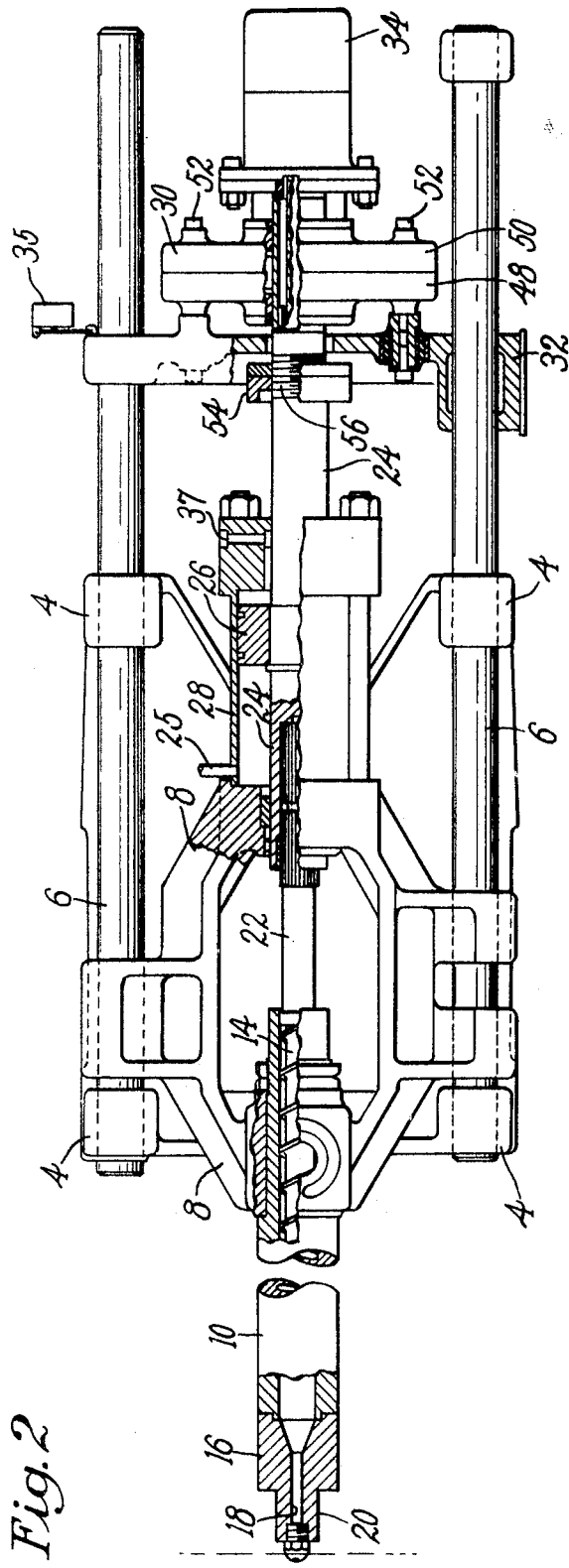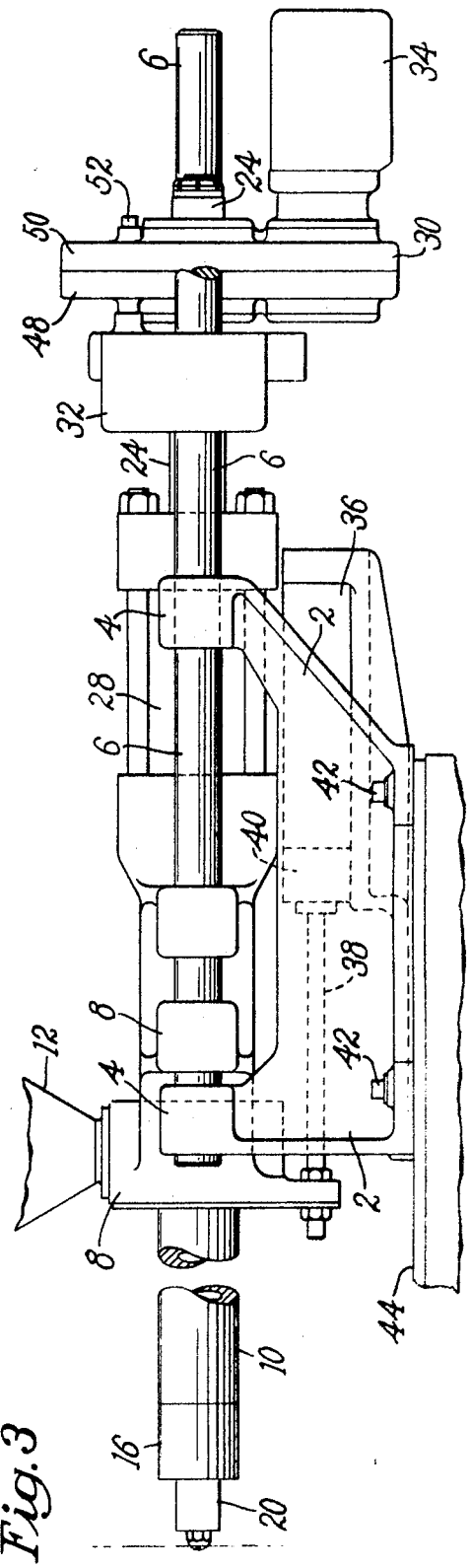

INJECTION MACHINES

BACKGROUND OF THE INVENTION

1. FIELD of the INVENTION

This invention relates to injection machines and is directed more particularly to the type of machine used in injection molding operations.

2. DESCRIPTION of the PRIOR ART

Injection molding machines have been encumbered by the requirements for motive apparatus for several machine movements. Means usually are required to move the nozzle of the machine into engagement with a mold assembly. Further motive means are required to rotate the plasticator screw. In addition, in the case of reciprocating-screw-type injection molding machines, motive means are required to move the screw axially within the plasticator housing. Often such apparatus occupies an undesirable amount of floorspace and renders the machine excessive in bulk and size.

Further, making basic changes in the machine to facilitate the handling of certain materials, such changes being replacement of the screw and the rotative motive means drive gears, generally requires excessive "downtime." The machine is usually out of production for a lengthy period because of the complexity of screw and gear changes.

SUMMARY OF THE INVENTION

It is an object of the present invention to provide an injection machine having means for moving the injection nozzle into engagement with a receptacle, as for example a mold assembly, and having means for moving the screw rotatively and axially in the plasticator housing, such motive means being so arranged as to occupy relatively little floorspace and to operate efficiently and economically.

It is a further object of the invention to provide such a machine in which there is provided means for quickly and easily replacing the plasticator screw and the rotative drive gears with a screw and gears of different design, whereby to enable the machine to process varied materials with a relatively short "downtime" during such machine part exchanges.

With the above and other objects in view, as will hereinafter appear, a feature of the present invention is the provision in a machine of the type above referred to of a frame, and first, second and third motive means mounted on the frame. The first motive means operates to move the plasticator nozzle into engagement with a receptacle, as for example, a mold assembly. The second motive means operates to move the plasticator screw axially to force molten material out the nozzle. The third motive means operates, through a set of reduction drive gears, to move the screw rotatively to plasticate the material fed into the plasticator housing. The plasticator housing and the drive gears are so arranged and disposed as to facilitate the interchange of the plasticator screw and drive gears with another screw and set of gears whereby to modify the operation of the machine to facilitate the processing of a different material.

The above and other features of the invention, including various novel details of construction and combinations of parts, will now be more particularly described with reference to the accompanying drawings and pointed out in the claims.

BRIEF DESCRIPTION OF THE DRAWINGS

Reference is made to the accompanying drawings in which there is shown an illustrative embodiment of the invention from which its novel features and advantages will be apparent.

FIG. 1 is a plan view, partly in section, of one form of injection molding machine illustrative of an embodiment of the invention;

FIG. 2 is similar to FIG. 1, but shows the machine at another position in its operating cycle; and FIG. 3 is an elevational view of the invention as shown in FIG. 2.

DESCRIPTION OF THE PREFERRED EMBODIMENT

Referring to the drawings, it will be seen that the illustrative machine includes a frame 2 having lugs 4 which support tie rods 6. Slidably mounted on the tie rods 6 is a first bracket 8 which supports a plasticator housing 10. A feed hopper 12 (FIG. 3) is also mounted on the first bracket and is in communication with the interior of the plasticator housing 10 (FIG. 2) for the purpose of conducting injection molding material into the plasticator.

Disposed within the plasticator housing 10 is a plasticator screw 14 (FIGS. 1 and 2) which is movable axially and rotatively in the housing 10. The forward end of the plasticator housing 10 is provided with a nozzle block 16 which is removable from the housing 10 and which includes a nozzle passage 18. The nozzle block 16 is provided with a nozzle portion 20 through which extends the passage 18. The plasticator screw 14 serves, by its rotational movement, to plasticate the injection molding material entering the housing 10 from the hopper 12, and by its axial movement to force plasticated material from the housing 10 through the nozzle passage 18.

The plasticator screw 14 is connected to a spindle 22 which at its rearward end is received by and connected to a piston rod 24 on which is fixed a piston 26 disposed in a drive cylinder 28. The piston rod 24 extends through the drive cylinder 28 and is received by a gear box 30 supported by a second bracket means 32. The second bracket means 32 is slidably disposed upon the tie rods 6. Mounted on the gear box 30 is a motor 34 for rotating the gears contained in the gear box and thereby the piston rod 24, the spindle 22 and the screw 14.

Mounted on the frame 2 is a positioning cylinder 36 (FIG. 3) having a piston rod 38 extending therefrom and connected to a piston 40 within the cylinder. The piston rod 38 is connected at its outer end to the first bracket 8 whereby to move the first bracket 8, and through the spindle 22 and piston rod 24 the second bracket 32, and all supported thereby, on the tie rods 6 responsive to the movement of the piston 40 in the positioning cylinder 36. Thus, the positioning cylinder 36 operates to move the plasticator 10 and nozzle 20 forwardly toward a mold assembly, or rearwardly therefrom as desired.

Bolts 42, 46 (FIGS. 1 and 3) connect the frame 2 of the machine to a base plate 44 (FIG. 3). One bolt 46 (FIG. 1) serves as a pivot about which the frame 2 can be pivoted on the base plate 44. In order to pivot the machine, the bolts 42 are removed and the machine moved manually to the position shown in phantom in FIG. 1. In machines of large size, a hydraulic assist or other such apparatus (not shown) may be used to facilitate such movement. Thus, in order to remove the screw 14 from the housing 10, the machine is pivoted about the pivot bolt 46 to move the nozzle portion of the plasticator free and clear of any receptacle or mold assembly normally located in line with the nozzle of the machine. The nozzle block 16 may then be removed, and the screw 14 disconnected from the piston rod 24 and withdrawn from the forward end of the housing 10, another screw subsequently being slipped into place, the nozzle block remounted and the machine pivoted about the bolt 46 into proper position and refastened by means of the bolts 42.

The gear box 30 comprises two separable portions 48, 50 retained by bolts 52. In order to replace the gears in the box 30, it is necessary only to remove the rearward portion 50, exchange sets of gears, and replace the box portion 50. Thus, alterations of major significance may be made in the speed of rotation of the screw as well as the torque.

In operation, if a new or different screw is desired, the machine is pivoted to the position shown in phantom in FIG. 1 and after the screw is replaced, returned to the position shown in full lines. If a different set of drive gears is desired the gear box 30 is opened, as described above, and the gears exchanged and the gear box closed.

To operate the machine, pressurized fluid is introduced to the positioning cylinder 36 to force the piston 40 forwardly (leftwardly as viewed in FIG. 3) whereby to carry the plasticator 10 and nozzle 20 to the desired injection location, as for example, in engagement with a mold assembly (not shown). Injection molding material is placed in the feed hopper 12 and the motor 34 started.

Operation of the motor 34 causes rotation of the screw 14 which plasticates the molding material in the housing 10 and urges it forwardly. As molten molding material builds up forward of the rotating screw 14, the screw moves axially rearwardly (rightwardly as viewed in the drawings). As the screw 14 moves rearwardly, so does the spindle 22, the piston rod 24, the piston 26 in the cylinder 28 and the second bracket 32 with the gear box 30 and motor 34 mounted thereon. Such rearward movement continues until a limit switch 35 (FIG. 2) is contacted. The limit switch 35 stops the motor, stopping the rotation of the screw and thereby the rearward movement of the screw. Thus, the point at which the limit switch is contacted determines the quantity of molding material to be forced from the plasticator during a cycle of operation. The limit switch is therefore selectively placed to provide the quantity of material desired to be injected per cycle.

Pressurized fluid is then introduced to the forward end of the piston 26 by way of an inlet 25 (FIGS. 1 and 2) to cause the piston 26 to move rearwardly a short distance further. Such additional rearward movement of the screw relieves pressure on the molten material forward of the screw. Inasmuch as the molten material forward of the screw is not under pressure, a mold assembly or the like may be removed from the nozzle and replaced with an empty one without escape of the material through the nozzle passage 18.

When it is desired to deliver the molten material, pressurized fluid is introduced through an inlet 37 (FIGS. 1 and 2) to the rearward end of the piston 26, forcing the piston forwardly in the cylinder 28, thereby forcing the screw 14 forwardly in the plasticator. Such movement of the screw forces the molten material through the nozzle passage 18. The screw moves forwardly until a stop nut 54 (FIG. 2) engages the drive cylinder 28 to stop movement of the piston rod and thereby the screw.

The stop nut 54 is disposed upon a threaded portion 56 of the piston rod 24 and is selectively positionable upon the piston rod to the extent of the threaded portion. Accordingly, screws of somewhat different length may be accommodated by selective positioning of the stop nut 54, the nut operating to stop movement of the screw axially before it engages the forward end of the plasticator housing.

By either automatic means (not shown) or manual means (not shown) the motor 34 is started again to commence a new cycle of operation.

Having thus described our invention, what we claim as new and desire to secure by Letters Patent of the United States is:

1. An injection machine comprising a frame, tie bars mounted on said frame, first bracket means supported by said tie bars, a plasticator mounted on said first bracket means, a cylinder supported by said first bracket means, motive means supported by second bracket means slidably mounted on said tie bars, a screw disposed on said plasticator, an extension of said screw extending through said cylinder and being connected to said motive means, a piston fixed to said screw extension and disposed within said cylinder, said cylinder being disposed between said screw and said motive means, said piston being operative in said cylinder to move said screw axially in said plasticator, and said motive means being movable axially with said screw and being operative to move said screw rotatively in said plasticator.

2. An injection machine according to claim 1 in which said motive means includes a set of gears for rotating the screw extension, said gears being retained on the second bracket by a separable part to facilitate removal and replacement of said gears from operative connection with said screw extension from one end of the machine and in which the screw and screw extension are operatively connected by a spline connection whereby the screw is axially removable from the plasticator from the opposite end of the machine.